United States Patent
Gonzalez et al.

(10) Patent No.: US 12,291,941 B2
(45) Date of Patent: May 6, 2025

(54) TUBING RETRIEVABLE SAFETY VALVE ASSEMBLY WITH SECONDARY FLAPPER AND SEAT

(71) Applicant: Halliburton Energy Services, Inc., Houston, TX (US)

(72) Inventors: Merced Gonzalez, Singapore (SG); Charles David McFate, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 419 days.

(21) Appl. No.: 17/938,341

(22) Filed: Oct. 6, 2022

(65) Prior Publication Data
US 2024/0117709 A1 Apr. 11, 2024

(51) Int. Cl.
*E21B 34/14* (2006.01)
*F16K 31/44* (2006.01)
*F16K 43/00* (2006.01)

(52) U.S. Cl.
CPC ........... *E21B 34/14* (2013.01); *F16K 31/445* (2013.01); *F16K 43/001* (2013.01); *E21B 2200/05* (2020.05); *E21B 2200/06* (2020.05)

(58) Field of Classification Search
CPC ........ E21B 21/10; E21B 21/103; E21B 34/12; E21B 34/14; E21B 2200/05; F16K 31/445
See application file for complete search history.

(56) References Cited

U.S. PATENT DOCUMENTS

| | | | |
|---|---|---|---|
| 4,457,379 A * | 7/1984 | McStravick | E21B 34/14 166/373 |
| 4,474,241 A * | 10/1984 | Freeman | E21B 21/10 137/71 |
| 6,401,824 B1 * | 6/2002 | Musselwhite | E21B 21/10 166/334.4 |
| 6,712,145 B2 | 3/2004 | Allamon | |
| 8,047,294 B2 | 11/2011 | Vick, Jr. et al. | |
| 8,353,353 B2 * | 1/2013 | Reaux | E21B 34/10 166/373 |
| 2007/0284119 A1 * | 12/2007 | Jackson | E21B 34/101 166/332.8 |
| 2011/0048742 A1 | 3/2011 | Smith et al. | |
| 2011/0155381 A1 | 6/2011 | Reaux | |

FOREIGN PATENT DOCUMENTS

WO 2018144495 A1 8/2018

OTHER PUBLICATIONS

International Search Report and Written Opinion dated Jul. 3, 2023 for corresponding PCT Patent Application No. PCT/US2022/077657 filed on Oct. 6, 2022.

* cited by examiner

*Primary Examiner* — Cathleen R Hutchins
(74) *Attorney, Agent, or Firm* — K&L Gates LLP (57) ABSTRACT

A tubing retrievable safety valve assembly and related methods are disclosed herein. The assembly includes a primary flapper, a secondary flapper, a flow tube, and a protective sleeve. The flow tube is shiftable between a downhole position that holds the primary flapper in an open position and an uphole position that allows the primary flapper to move to a closed position. The protective sleeve, when positioned in an uphole position, holds the secondary flapper valve in an open position. The protective sleeve is shiftable to a downhole position to allow the secondary flapper to move to a closed position, for example, upon failure of the primary flapper.

17 Claims, 6 Drawing Sheets

TUBING RETRIEVABLE SAFETY VALVE ASSEMBLY WITH SECONDARY FLAPPER AND SEAT

BACKGROUND

This section is intended to provide relevant background information to facilitate a better understanding of the various aspects of the described embodiments. Accordingly, these statements are to be read in this light and not as admissions of prior art.

One or more subsurface safety valves are commonly installed as part of a production tubing string within oil and gas wells to protect against the communication of high-pressure and high-temperature formation fluids to the surface under certain circumstances. These subsurface safety valves are typically designed to shut in production from the formation in response to a variety of abnormal and potentially dangerous conditions.

Subsurface safety valves built into the tubing string are typically referred to as tubing retrievable safety valves (TRSVs). TRSVs are often subjected to years of service in severe operating conditions, and as a result, failure of TRSVs may occur. For example, a TRSV in the closed position may leak. Alternatively, a TRSV in the closed position may not properly open. Because of potential issues that may arise the absence of a properly functioning TRSV, a secondary means for blocking fluid flow through the tubing string is typically required.

Wireline retrievable safety valves (WRSVs) may be inserted inside an existing TRSV (e.g., an improperly functioning TRSV) and may operate to provide a similar safety function as the existing TRSV. WRSVs are generally designed to be lowered into place from the surface via wireline and locked in place inside the existing TRSV.

However, numerous drawbacks can exist related to the installation and use of WRSVs. For example, installing a WRSV can be a complicated and time consuming process that requires multiple trips down the tubing string with wireline service tools. First, the existing TRSV is typically locked out in a closed position. Second, the WRSV is inserted inside the existing TRSV. Third, the control line of the existing TRSV is communicated to the WRSV. This third step typically requires drilling a hole through the flow tube of the existing TRSV to create a communication path for hydraulic fluid to pass to the WRSV. Any mistakes during drilling and control line communication can lead to issues such as the leakage of hydraulic fluid.

As another example, WRSVs typically restrict the flow path through the tubing string. This is because WRSVs generally are designed to be located within an existing TRSV. Therefore, WRSVs inherently have a smaller flow diameter compared to the existing TRSV.

As yet another example, the setting depth at which WRSVs can be used is typically limited. As the setting depth of a WRSV along the tubing string increases, so does the pressure exerted by formation fluids against the control mechanism of the WRSV (e.g., springs, hydraulic fluid). At setting depths where the control mechanism cannot overcome this pressure to maintain a closed position, the WRSV cannot be used.

A need exists, therefore, for a secondary means of blocking fluid flow through the tubing string that avoids the various drawbacks of WRSVs.

BRIEF DESCRIPTION OF THE DRAWINGS

Embodiments of a TRSV assembly with a secondary flapper, and related methods, are described with reference to the following figures. The same or sequentially similar numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure describes a TRSV assembly and related methods. The TRSV assembly includes a primary flapper, a secondary flapper, a flow tube, and a protective sleeve. The primary flapper and the secondary flapper are each movable between an open position and a closed position. Further, the flow tube is shiftable between a downhole position and an uphole position. When in the downhole position, the flow tube retains the primary flapper in the open position. Shifting the flow tube to the uphole position allows the primary flapper to move to the closed position. The protective sleeve retains the secondary flapper valve in the open position and is shiftable in a downhole direction to allow the secondary flapper to move to the closed position, for example, when there is a failure related to the primary flapper.

Figure 1:
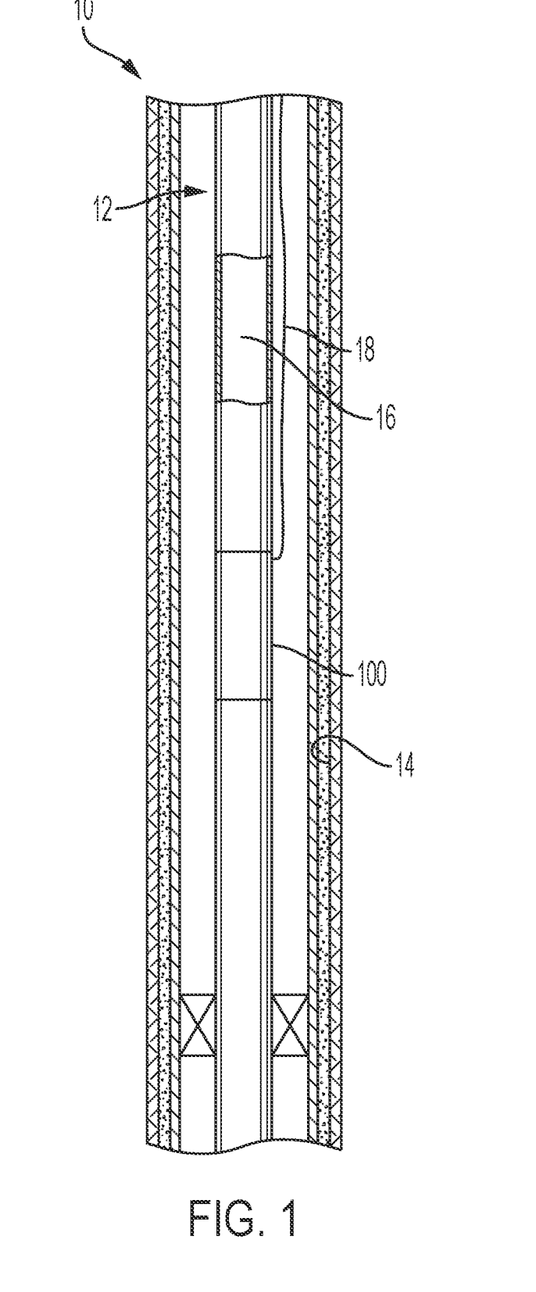
FIG. 1 is a schematic partially cross-sectional view of a safety valve system including a TRSV assembly, according to one or more embodiments.

FIG. 1 shows an illustrative safety valve system 10 including a TRSV assembly 100. In the safety valve system 10, a tubing string 12 is positioned within a wellbore 14 of a subterranean well. The tubing string 12 has an internal flow passage 16 for producing fluid (e.g., oil, gas, etc.) from the well. The TRSV assembly 100 is interconnected in the tubing string 12 to shut off flow through the passage 16, for example, in the event of an emergency.

One or more than one line 18, such as a hydraulic control line, may be connected to the TRSV assembly 100 to provide hydraulic pressure for controlling the actuation of various components included in the TRSV assembly 100. In another aspect, various components of the TRSV assembly 100 may be actuated using electrical lines, optical lines, or other types of lines. In yet another aspect, various components of the TRSV assembly 100 may be actuated using telemetry, such as acoustic, electromagnetic, pressure pulse, or another type of telemetry.

Figure 2:
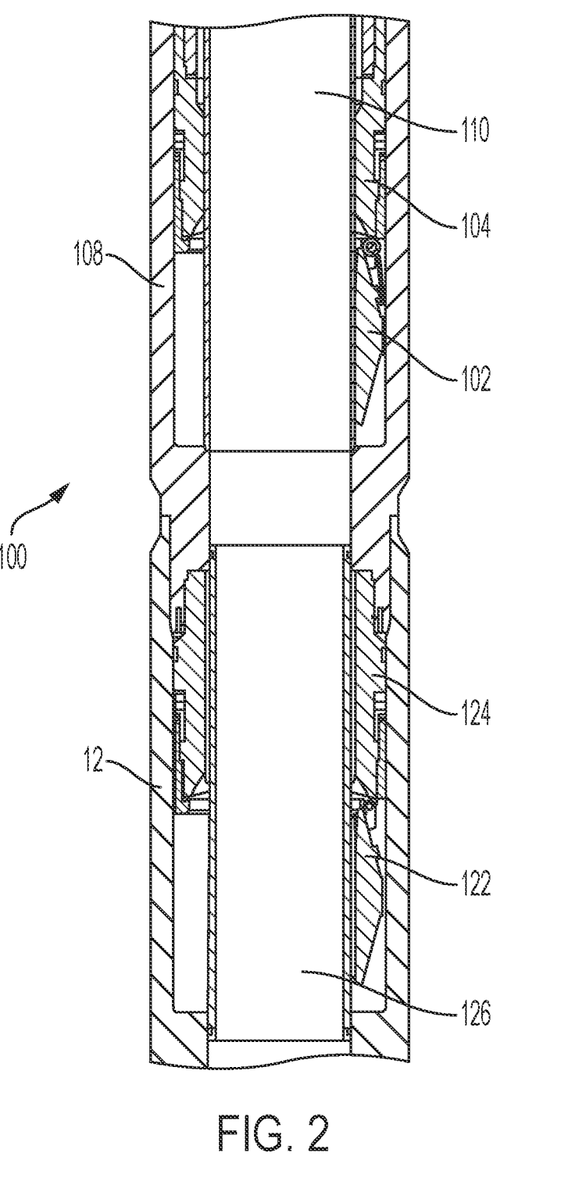
FIG. 2 is a cross section of the TRSV assembly showing a primary flapper in an open position, according to one or more embodiments.
Figure 3:
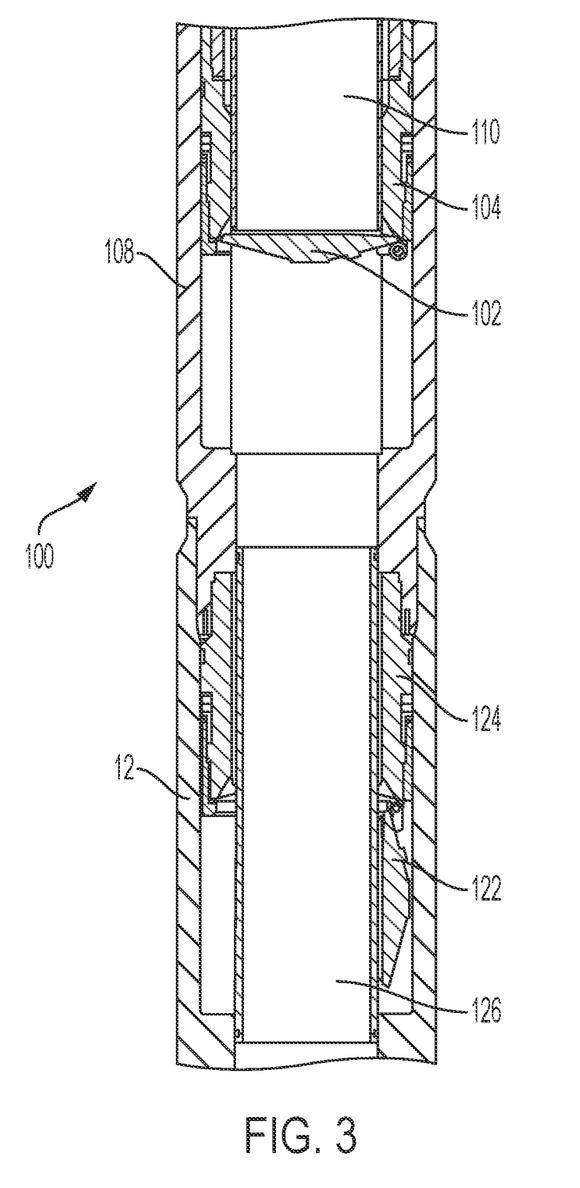
FIG. 3 is a cross section of the TRSV assembly showing the primary flapper in a closed position, according to one or more embodiments.
Figure 4:
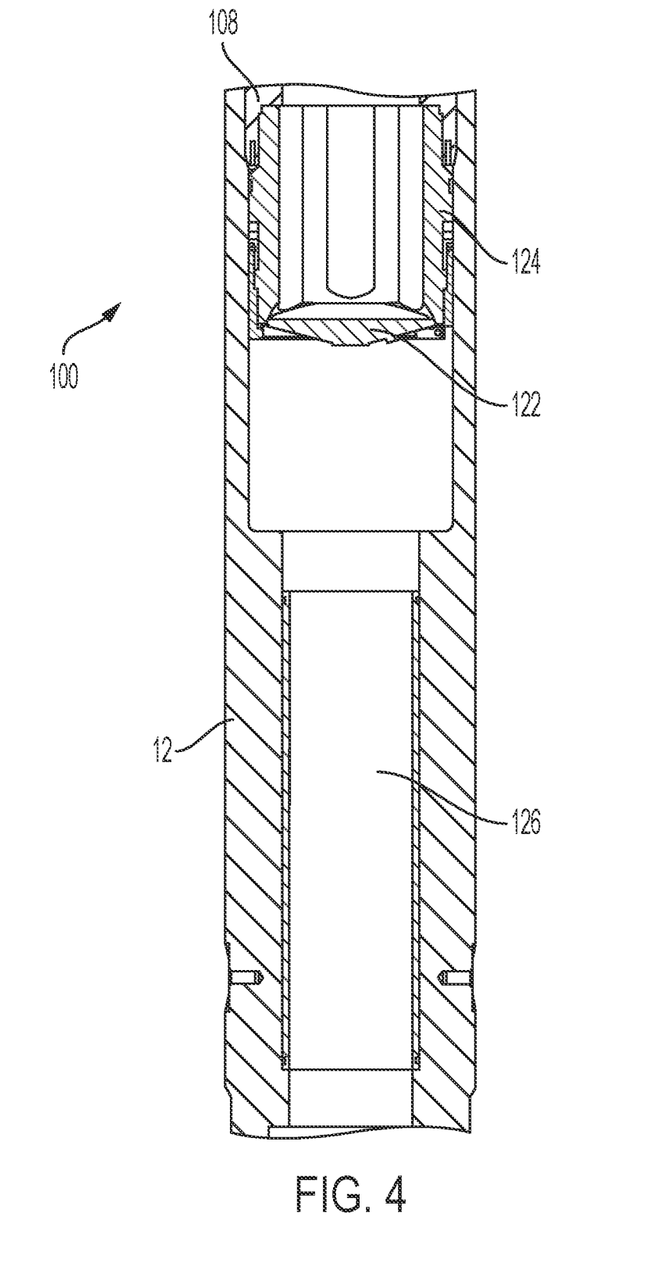
FIG. 4 is a cross section of the TRSV assembly showing a protective sleeve after it has been shifted downhole to place a secondary flapper in service, according to one or more embodiments.

FIGS. 2-6 show an illustrative embodiment of the TRSV assembly 100. Referring primarily to FIG. 2, the TRSV assembly 100 includes a primary flapper 102, a primary seat 104, a secondary flapper 122, and a secondary seat 124. In some aspects, the primary flapper 102 and the primary seat 104 may be housed within a connector 108 that connects the TRSV assembly 100 to a downhole portion of the tubing string 12. Further, in some aspects, the secondary flapper 122 and the secondary seat 124 may extend into a downhole portion of the tubing string 12 from the connector 108.

As shown in FIG. 2, under fluid production conditions, the flow tube 110 is positioned in a downhole position. In the downhole position, the flow tube 110 retains the primary flapper 102 in an open position that allows fluid to flow through the TRSV assembly 100. Transitioning to FIG. 3, the flow tube 110 is shiftable to an uphole position that allows the primary flapper 102 to move to a closed position. In the closed position, the primary flapper 102 is seated against the primary seat 104 to prevent fluid flow in the uphole direction through the TRSV assembly 100. Thus, the flow tube 110 and the primary flapper 102 can be actuated to prevent fluid flow uphole through the tubing string 12, for example, during an emergency condition.

The flow tube 110 and the primary flapper 102 may be configured such that the primarily flapper 102 is "normally closed" (e.g., such that the flapper defaults to closed position). For example, the flow tube 110 may be biased to the uphole position shown in FIG. 3 and the primary flapper 102 may be biased to the closed position shown in FIG. 3. In some aspects, the flow tube 110 may be biased to the uphole position using a spring, such as the spring 114 shown in FIG. 5. Similarly, the primary flapper 102 may be biased to the closed position using a spring. A control line, such as the one or more than one line 18 described above with respect to FIG. 1, may be used to provide hydraulic pressure to shift the flow tube 110 from the uphole position shown in FIG. 3 to the downhole position shown in FIG. 2, thereby moving the primary flapper 102 to the open position. Thus, if control line communication to the TRSV assembly 100 is lost (e.g., if hydraulic pressure is lost), the flow tube 110 will default to the uphole position causing the primary flapper 102 to close.

As noted above, safety valve failures can sometimes occur. For example, various components of the primary flapper 102 and/or the primary seat 104 may become damaged and allow fluid to leak across the TRSV assembly 100 when the primary flapper 102 is in the closed position. Accordingly, the TRSV assembly 100 includes a secondary flapper 122 and a secondary seat 124 to prevent fluid flow across the TRSV assembly 100, for example, when the primary flapper 102 and/or the primary seat 104 fail(s).

Referring again primarily to FIGS. 2 and 3, under conditions where the primary flapper 102 is used to control flow through the TRSV assembly 100 (e.g., prior to a failure of the primary flapper 102), the secondary flapper 122 is retained in an open position by a protective sleeve 126 positioned in an uphole position. When in the uphole position, the protective sleeve 126 can isolate the secondary flapper 122 and the secondary seat 124 from any fluids that may be flowing through the TRSV assembly flow (e.g., production fluids flowing through the TRSV assembly 100). Transitioning to FIG. 4, the protective sleeve 126 is shiftable in a downhole direction (e.g., into a downhole portion of the tubing string) and into a downhole position that allows the secondary flapper 122 to move to a closed position. In the closed position, the secondary flapper 122 is seated against the secondary seat 124 to prevent fluid flow through the TRSV assembly 100 in the uphole direction.

In some aspects, a wireline service tool may be fed downhole through the tubing string 12 and into the TRSV assembly 100 to shift the protective sleeve 126 to the downhole position. In other aspects, as discussed more below, a secondary opening prong 128 used to control the actuation of the secondary flapper 122 may alternatively be used to shift the protective sleeve 126 to the downhole position. The protective sleeve 126 is fixed against the downhole tubing string 12 as it is shifted downhole to retain the protective sleeve 126 in the downhole position. Fixing the protective sleeve 126 against the downhole tubing string 12 can ensure that the protective sleeve 126 does not subsequently shift uphole and interfere with the actuation of the secondary flapper 122. Helical teeth or other securing means may be included on an outer surface of the protective sleeve 126 to fix protective sleeve 126 against the downhole tubing string 12.

Figure 5:
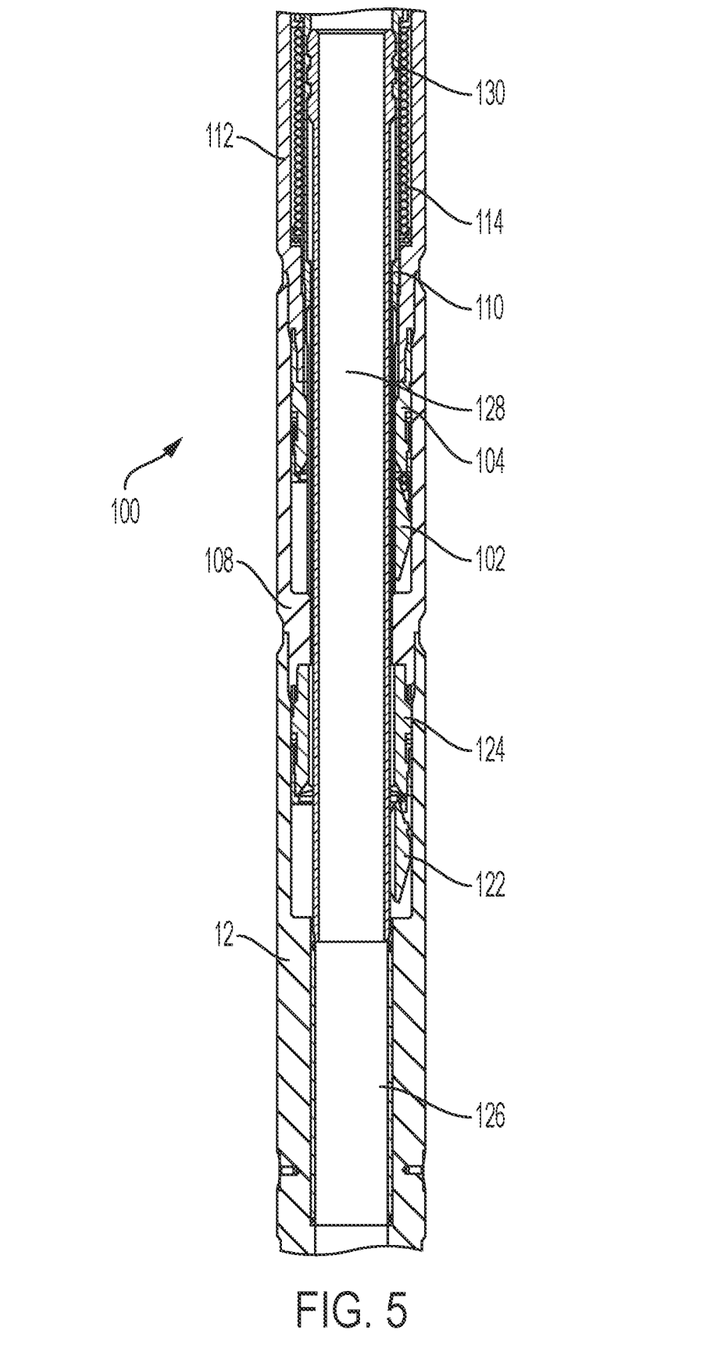
FIG. 5 is a cross section of the TRSV assembly showing the secondary flapper in an open position, according to one or more embodiments.
Figure 6:
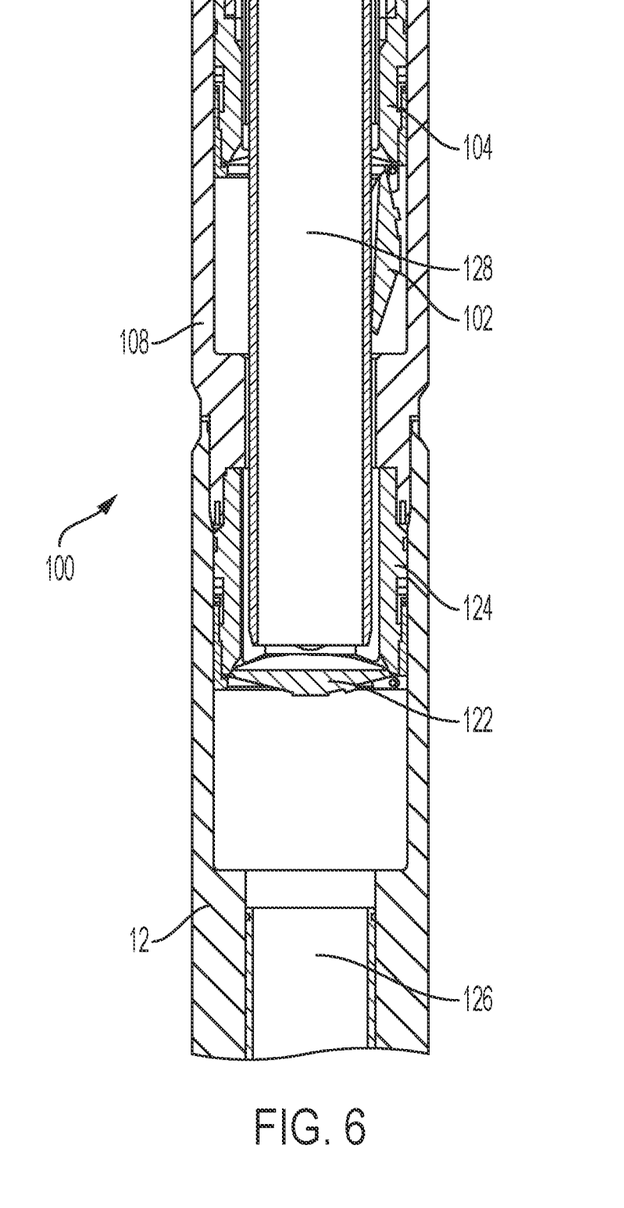
FIG. 6 is a cross section of the TRSV assembly showing the secondary flapper in a closed position, according to one or more embodiments.

Referring to FIGS. 5 and 6, a secondary opening prong 128 is used to control the actuation of the secondary flapper 122 after the protective sleeve 126 has been shifted to the downhole position. The secondary opening prong 128 may be installed by feeding the secondary opening prong 128 downhole through the tubing string 12 and into the TRSV assembly 100. As shown in FIG. 5, the secondary opening prong 128 is connected to the flow tube 110 at a connection 130. The connection 130 may include a profile on a radially outer surface of the secondary opening prong 128 that compliments a profile on a radially inner surface of the flow tube 110. For example, the connection 130 may include grooves on a radially inner surface of the flow tube 110 that complement grooves on radially outer surface of the secondary opening prong 128. The grooves on the radially inner surface of the flow tube 110 may also be used to manually shift the flow tube 110 in service situations.

The secondary opening prong 128 serves as an extension of the flow tube 110 and is used to actuate the secondary flapper 122 in a manner similar to how the flow tube 110 is used to actuate the primary flapper 102. Furthermore, acting as extension of the flow tube 110, the secondary opening prong 128 uses the same actuation mechanism (e.g., the spring 114 and the control line 18) as the flow tube 110. Thus, except for the secondary opening prong 128, no additional equipment needs to be added to the TRSV assembly 100 to actuate the secondary flapper 122.

For example, referring to FIG. 5, under fluid production conditions (after the primary flapper 102 is taken out of service and the secondary opening prong 128 is attached to the flow tube 110), the flow tube 110 is positioned in the downhole position. Positioning the flow tube 110 in the downhole position causes the secondary opening prong 128 to be positioned downhole and retain the secondary flapper 122 in an open position that allows fluid to flow uphole through the TRSV assembly 100. Transitioning to FIG. 6, shifting the flow tube 110 from the downhole position to the uphole position causes the secondary opening prong 128 to shift uphole thereby allowing the secondary flapper 122 to move to a closed position. In the closed position, the secondary flapper 122 is seated against the secondary seat 124 to prevent fluid flow uphole through the TRSV assembly 100. Thus, similar to the flow tube 110 and the primary flapper 102, the secondary opening prong 128 and the secondary flapper 122 can be actuated to prevent fluid flow uphole through the tubing string 12, for example, during an emergency condition.

The flow tube 110, the secondary opening prong 128, and the secondary flapper 122 may be configured such that the secondary flapper 122 is "normally closed" (e.g., such that the flapper defaults to closed position). For example, as explained above, the flow tube 110 may be biased to the uphole position shown in FIG. 3 (and in FIG. 6). Because of the connection 130 between the flow tube 110 and the secondary opening prong 128, the secondary opening prong 128 is also biased to the uphole position shown in FIG. 6. In some aspects, the flow tube 110 and the secondary opening prong 128 may be biased to the uphole position using a spring, such as the spring 114 shown in FIG. 5. Further, the secondary flapper 122 may be biased to the closed position shown in FIG. 6, for example, using a spring. A control line, such as the one or more than one line 18 described above with respect to FIG. 1, may be used to provide hydraulic pressure to shift the flow tube 110 and the secondary opening prong 128 from the uphole position shown in FIG. 6 to the downhole position shown in FIG. 5, thereby moving the secondary flapper 122 to the open position. Thus, if control line hydraulic pressure communication to the TRSV assembly 100 is lost (e.g., if hydraulic pressure is lost), the flow tube 110 and the secondary opening prong 128 will default to the uphole position causing the secondary flapper 122 to close.

As noted above, the secondary opening prong 128 may be used to shift the protective sleeve 126 downhole when transitioning service from the primary flapper 102 to the secondary flapper 122. For example, feeding the secondary opening prong 128 through the tubing string 12 and into the TRSV assembly 100 may cause the secondary opening prong 128 to push against the protective sleeve 126 and shift the protective sleeve 126 downhole out of the way of the secondary flapper 122. As another example, after the secondary opening prong 128 is connected to the flow tube 110, with the flow tube 110 in the uphole position, and with the protective sleeve 126 still blocking the secondary flapper 122, the control line 18 may be used to provide hydraulic pressure to shift the flow tube 110 and the secondary opening prong 128 to the downhole position. This may cause the secondary opening prong 128 to push against the protective sleeve 126 and shift the protective sleeve 126 downhole out of the way of the secondary flapper 122. Using the secondary opening prong 128 to shift the protective sleeve 126 downhole may avoid the need to use a separate service tool to shift the protective sleeve 126 downhole. Accordingly, rather than requiring a first trip through the tubing string 12 to shift the protective sleeve 126 downhole and a second trip to install the secondary opening prong 128, the protective sleeve 126 can be shifted downhole and the secondary opening prong 128 can be installed with only a single wireline trip through the tubing string 12.

The TRSV assembly 100 can provide numerous technical benefits. For example, upon failure of the primary flapper 102, the secondary flapper 122 can be put into service with only one or two wireline service trips down the tubing string 12. Further, the secondary flapper 122 can be put into service without any modifications to the control line 18. Conversely, as explained above, putting a WRSV into service typically requires three wireline service trips down the tubing string and also typically requires modification of the control line (e.g., drilling into the flow tube of the existing TRSV for hydraulic fluid communication).

As another example, the secondary flapper 122 of the TRSV assembly 100 can be put into service without significantly restricting the flow path of the tubing string 12 when secondary flapper 122 is in the open position. This is because the protective sleeve 126 that is shifted downhole to put the secondary flapper 122 into service has an inner diameter that is substantially the same as the inner diameter of the rest of the TRSV assembly 100. Conversely, as explained above, installing a WRSV typically results in a restricted flow path because WRSVs generally are designed to be located within an existing TRSV and inherently have a smaller flow diameter compared to the existing TRSV.

As yet another example, actuation of the secondary flapper 122 is controlled by the same control line 18 that is used to actuate the primary flapper 102. Thus, the setting depth at which the secondary flapper 122 can be used is similar to that of a typical TRSV. Conversely, as noted above, the setting depth at which WRSVs can be located is typically shallower than that of typical TRSVs.

Examples of the above embodiments include:

Example 1 is a tubing retrievable safety valve assembly. The assembly includes a primary flapper, a secondary flapper, a flow tube, and a protective sleeve. The primary flapper is movable between a first open position and a first closed position. The primary flapper prevents flow through the assembly in an uphole direction when in the first closed position. The secondary flapper is movable between a second open position and a second closed position. The secondary flapper prevents flow through the assembly in an uphole direction when in the second closed position. The flow tube is shiftable between a first downhole position that retains the primary flapper in the first open position and a first uphole position that allows the primary flapper to move to the first closed position. The protective sleeve is positionable in a second uphole position to retain the secondary flapper in the second open position. Further, the protective sleeve is shiftable to a second downhole position to allow the secondary flapper to move to the second closed position.

In Example 2, the subject matter of Example 1 can further include wherein a secondary opening prong is attachable to the flow tube to retain the secondary flapper in the second open position after the protective sleeve is shifted to the second downhole position.

In Example 3, the subject matter of Examples 1-2 can further include wherein shifting the flow tube from the first downhole position to the first uphole position when the secondary opening prong is attached thereto causes the secondary opening prong to shift uphole to allow the secondary flapper to move to the second closed position.

In Example 4, the subject matter of Examples 1-3 can further include wherein the primary flapper is biased to the first closed position, wherein the secondary flapper is biased to the second closed position, and wherein the flow tube is biased to the first uphole position.

In Example 5, the subject matter of Examples 1-4 can further include wherein the protective sleeve isolates the secondary flapper from fluid flow when the protective sleeve is positioned in the second uphole position.

In Example 6, the subject matter of Examples 1-5 can further include wherein the protective sleeve is shiftable from the second uphole position to the second downhole position using a service tool.

In Example 7, the subject matter of Examples 1-6 can further include shifting the flow tube from the first uphole position to the first downhole position when the secondary opening prong is attached thereto causes the secondary flapper to move from the second closed position to the second open position.

In Example 8, the subject matter of Examples 1-7 can further include wherein shifting the flow tube from the first uphole position to the first downhole position when the secondary opening prong is attached thereto and when the protective sleeve is in the second uphole position causes the secondary opening prong to shift the protective sleeve to the second downhole position.

In Example 9, the subject matter of Examples 1-8 can further include wherein shifting the protective sleeve from the second uphole position to the second downhole position causes the protective sleeve to be fixed against a tubing string downhole of the assembly.

Example 10 is a method of using tubing retrievable safety valve assembly. The tubing retrievable safety valve assembly includes a primary flapper, a secondary flapper, a flow tube, and a protective sleeve. The method includes retaining the primary flapper in a first open position by positioning the flow tube in a first downhole position. The method further includes moving the primary flapper from the first open position to a first closed position by shifting the flow tube to a first uphole position. The method further includes retaining the secondary flapper in a second open position by positioning the protective sleeve in a second uphole position. The method further includes, upon failure of the primary flapper, shifting the protective sleeve to a second downhole position to allow the secondary flapper to move from the second open position to a second closed position.

In Example 11, the subject matter of Example 10 further includes attaching a secondary opening prong to the flow tube and retaining the secondary flapper in the second open position with the secondary opening prong after the protective sleeve is shifted from the second uphole position to the second downhole position.

In Example 12, the subject matter of Examples 10-11 can further include, after retaining the secondary flapper in the second open position with the secondary opening prong, moving the secondary flapper to the second closed position by shifting the flow tube from the first downhole position to the first uphole position to cause the secondary opening prong to shift in an uphole direction.

In Example 13, the subject matter of Examples 10-12 can further include biasing the secondary flapper to the second closed position, and biasing the flow tube to the uphole position.

In Example 14, the subject matter of Examples 10-13 can further include wherein the flow tube is biased to the first uphole position using a spring.

In Example 15, the subject matter of Examples 10-14 can further include wherein shifting the protective sleeve from the second uphole position to the second downhole position further comprises shifting the protective sleeve using a service tool.

In Example 16, the subject matter of Examples 10-15 can further include, after attaching the secondary opening prong to the flow tube, shifting the flow tube from the first uphole position to the first downhole position to cause the secondary flapper to move from the second closed position to the second open position.

In Example 17, the subject matter of Examples 10-16 can further include wherein shifting the protective sleeve from the second uphole position to the second downhole position comprises, after attaching the secondary opening prong to the flow tube, shifting the flow tube from the first uphole position to the first downhole position to cause the secondary opening prong to shift in a downhole direction and cause the secondary opening prong to shift the protective sleeve to the second downhole position.

Example 10 is a well production system. The system includes a production tubing string and a tubing retrievable safety valve assembly included in the production string. The assembly includes a primary flapper, a secondary flapper, a flow tube, and a protective sleeve. The primary flapper is movable between a first open position and a first closed position. The primary flapper prevents flow through the assembly in an uphole direction when in the first closed position. The secondary flapper is movable between a second open position and a second closed position. The secondary flapper prevents flow through the assembly in an uphole direction when in the second closed position. The flow tube is shiftable between a first downhole position that retains the primary flapper in the first open position and a first uphole position that allows the primary flapper to move to the first closed position. The protective sleeve is positionable in a second uphole position to retain the secondary flapper in the second open position. Further, the protective sleeve is shiftable to a second downhole position to allow the secondary flapper to move to the second closed position.

In Example 20, the subject matter of Example 19 can further include wherein a secondary opening prong is attachable to the flow tube to retain the secondary flapper in the second open position after the protective sleeve is shifted to the second downhole position.

In Example 21, the subject matter of Examples 19-20 can further include the subject matter of any of Examples 3-9.

Certain terms are used throughout the description and claims to refer to particular features or components. As one skilled in the art will appreciate, different persons may refer to the same feature or component by different names. This document does not intend to distinguish between components or features that differ in name but not function.

While compositions and methods are described herein in terms of "comprising" various components or steps, the compositions and methods can also "consist essentially of" or "consist of" the various components and steps.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques accepted by those skilled in the art.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:
1. A tubing retrievable safety valve assembly, comprising:
 a primary flapper movable between a first open position and a first closed position, wherein the primary flapper prevents flow through the assembly in an uphole direction when in the first closed position;
 a secondary flapper movable between a second open position and a second closed position, wherein the secondary flapper prevents flow through the assembly in an uphole direction when in the second closed position;
 a flow tube shiftable between:

a first downhole position to retain the primary flapper in the first open position; and a first uphole position to allow the primary flapper to move to the first closed position;

a protective sleeve positionable in a second uphole position to retain the secondary flapper in the second open position, wherein the protective sleeve is shiftable to a second downhole position upon failure of the primary flapper to allow the secondary flapper to move to the second closed position; and a secondary opening prong is attachable to the flow tube to retain the secondary flapper in the second open position after the protective sleeve is shifted to the second downhole position.

2. The assembly of claim 1, wherein shifting the flow tube from the first downhole position to the first uphole position when the secondary opening prong is attached thereto causes the secondary opening prong to shift uphole to allow the secondary flapper to move to the second closed position.

3. The assembly of claim 2, wherein the primary flapper is biased to the first closed position, wherein the secondary flapper is biased to the second closed position, and wherein the flow tube is biased to the first uphole position.

4. The assembly of claim 3, wherein the protective sleeve isolates the secondary flapper from fluid flow when the protective sleeve is positioned in the second uphole position.

5. The assembly of claim 3, wherein the protective sleeve is shiftable from the second uphole position to the second downhole position using a service tool.

6. The assembly of claim 3, wherein shifting the flow tube from the first uphole position to the first downhole position when the secondary opening prong is attached thereto causes the secondary flapper to move from the second closed position to the second open position.

7. The assembly of claim 3, wherein shifting the flow tube from the first uphole position to the first downhole position when the secondary opening prong is attached thereto and when the protective sleeve is in the second uphole position causes the secondary opening prong to shift the protective sleeve to the second downhole position.

8. The assembly of claim 3, wherein shifting the protective sleeve from the second uphole position to the second downhole position causes the protective sleeve to be fixed against a tubing string downhole of the assembly.

9. A method of using a tubing retrievable safety valve assembly, the method comprising:
retaining a primary flapper in a first open position by positioning a flow tube in a first downhole position;
moving the primary flapper from the first open position to a first closed position by shifting the flow tube to a first uphole position;
retaining a secondary flapper in a second open position by positioning a protective sleeve in a second uphole position;
upon failure of the primary flapper, shifting the protective sleeve from the second uphole position to a second downhole position to allow the secondary flapper to move from the second open position to a second closed position;
attaching a secondary opening prong to the flow tube; and
retaining the secondary flapper in the second open position with the secondary opening prong after the protective sleeve is shifted from the second uphole position to the second downhole position.

10. The method of claim 9, further comprising, after retaining the secondary flapper in the second open position with the secondary opening prong, moving the secondary flapper to the second closed position by shifting the flow tube from the first downhole position to the first uphole position to cause the secondary opening prong to shift in an uphole direction.

11. The method of claim 10, further comprising:
biasing the secondary flapper to the second closed position; and
biasing the flow tube to the first uphole position.

12. The method of claim 11, wherein the flow tube is shifted from the first uphole position to the first downhole position by providing hydraulic pressure using a hydraulic control line.

13. The method of claim 11, wherein shifting the protective sleeve from the second uphole position to the second downhole position further comprises shifting the protective sleeve using a service tool.

14. The method of claim 11, further comprising, after attaching the secondary opening prong to the flow tube, shifting the flow tube from the first uphole position to the first downhole position to cause the secondary flapper to move from the second closed position to the second open position.

15. The method of claim 9, wherein shifting the protective sleeve from the second uphole position to the second downhole position comprises, after attaching the secondary opening prong to the flow tube, shifting the flow tube from the first uphole position to the first downhole position to cause the secondary opening prong to shift in a downhole direction and cause the secondary opening prong to shift the protective sleeve to the second downhole position.

16. The method of claim 9, further comprising fixing the protective sleeve against a tubing string downhole of the assembly while shifting the protective sleeve to the second downhole position.

17. A well production system, comprising:
a production tubing string; and
a tubing retrievable safety valve assembly included in the production tubing string, the tubing retrievable safety valve assembly comprising:
a primary flapper movable between a first open position and a first closed position, wherein the primary flapper prevents flow through the assembly in an uphole direction when in the first closed position;
a secondary flapper movable between a second open position and a second closed position, wherein the secondary flapper prevents flow through the assembly in an uphole direction when in the second closed position;
a flow tube shiftable between:
a first downhole position to retain the primary flapper in the first open position; and
a first uphole position to allow the primary flapper to move to the first closed position;
a protective sleeve positionable in a second uphole position to retain the secondary flapper in the second open position, wherein the protective sleeve is shiftable to a second downhole position upon failure of the primary flapper to allow the secondary flapper to move to the second closed position; and
a secondary opening prong is attachable to the flow tube to retain the secondary flapper in the second open position after the protective sleeve is shifted to the second downhole position.

* * * * *